United States Patent [19]

Wood

[11] 4,237,526
[45] Dec. 2, 1980

[54] BATTERY OPERATED DEVICE HAVING A WATERPROOF HOUSING AND GAS DISCHARGE VENT

[75] Inventor: David H. Wood, Avon Lake, Ohio

[73] Assignee: Union Carbide Corporation, New York, N.Y.

[21] Appl. No.: 907,852

[22] Filed: May 19, 1978

[51] Int. Cl.³ ............................................. F21L 7/00
[52] U.S. Cl. .................................... 362/158; 362/202; 362/267
[58] Field of Search ........................ 362/158, 267, 202

[56] References Cited

U.S. PATENT DOCUMENTS 3,794,825  2/1974  Kropansky ........................ 362/158

Primary Examiner—Stephen J. Lechert, Jr.
Attorney, Agent, or Firm—Cornelius F. O'Brien

[57] ABSTRACT

An electrically operated device comprising a waterproof housing enclosing at least one dry galvanic battery cell and including gas discharge means in the housing in communication with the atmosphere exterior to the device for discharging evolved hydrogen gas from the battery cell such that the concentration of hydrogen gas within the housing interior is maintained below about 10% by volume.

16 Claims, 8 Drawing Figures

U.S. Patent   Dec. 2, 1980   Sheet 1 of 2   4,237,526
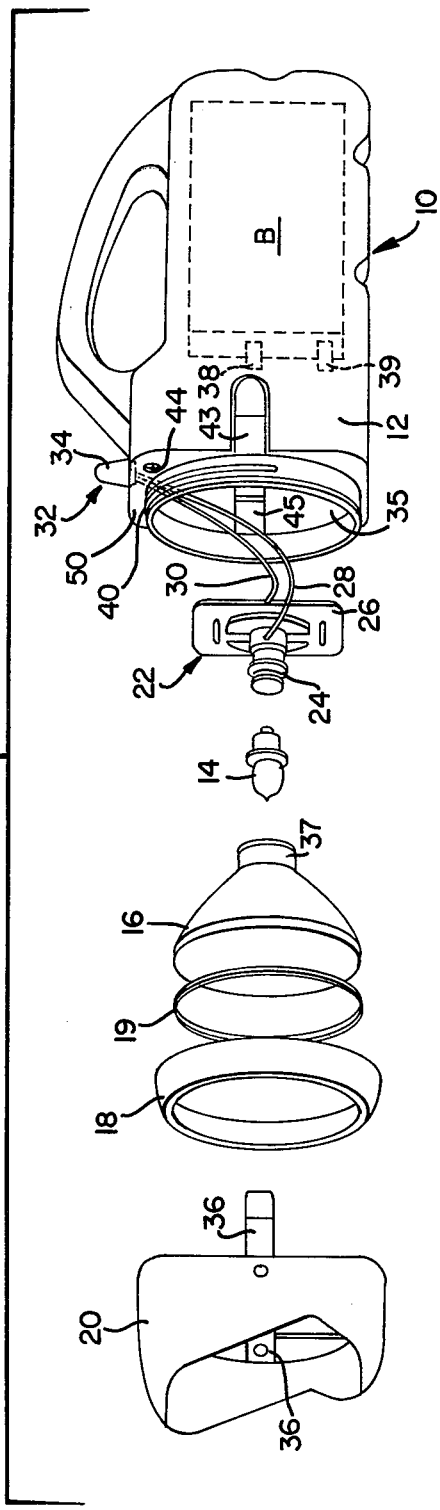
FIG 1
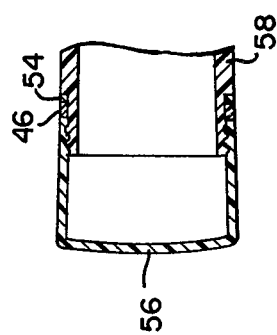
FIG 2a
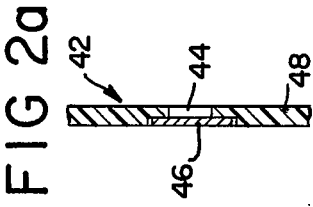
FIG 2b
FIG 2c
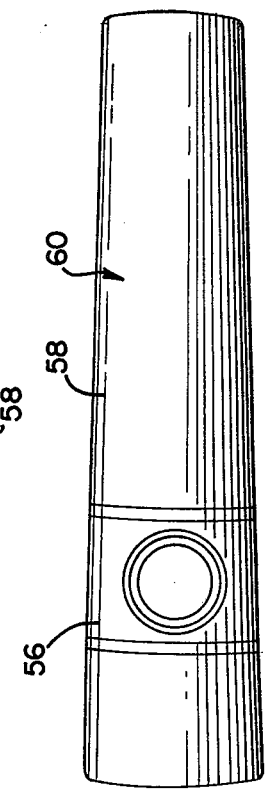
FIG 3a
FIG 3b

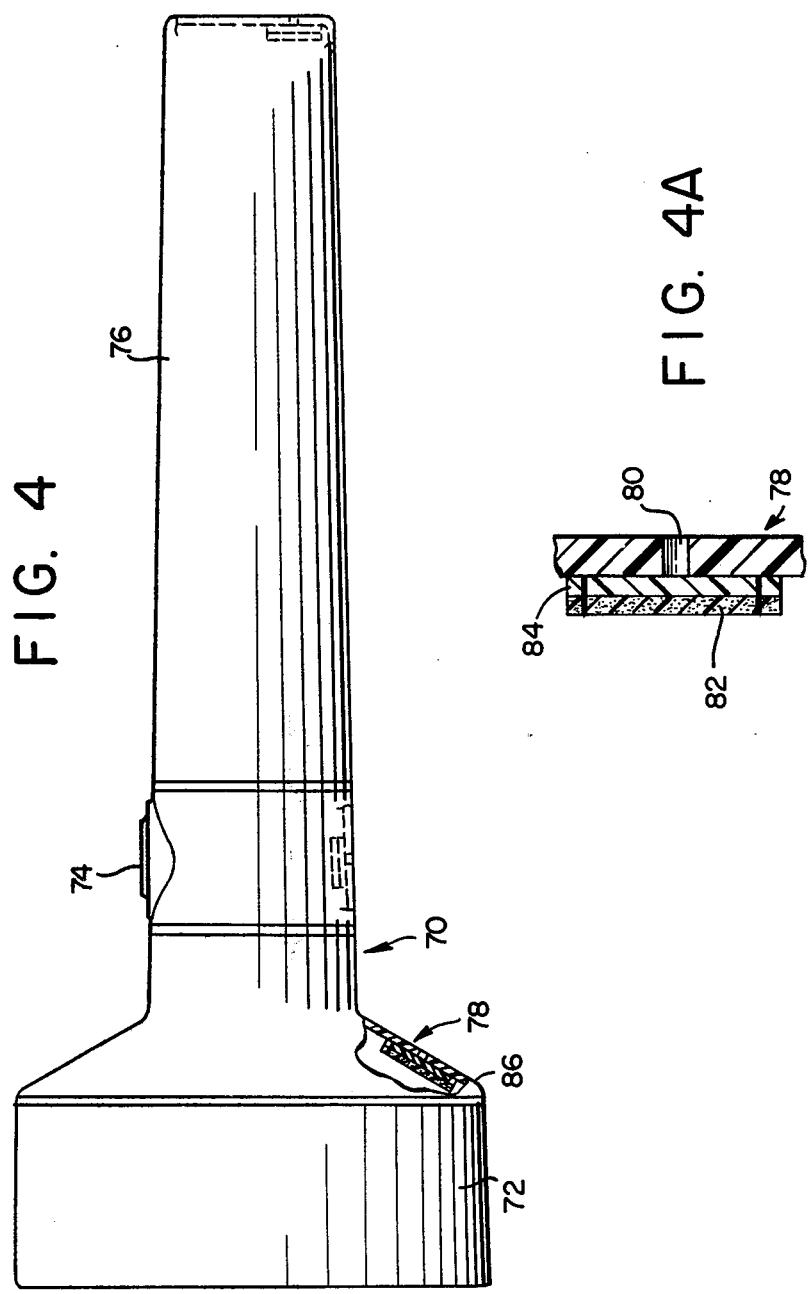

BATTERY OPERATED DEVICE HAVING A WATERPROOF HOUSING AND GAS DISCHARGE VENT

This invention relates to waterproof battery operated electrical devices and more particularly to a waterproof housing for such devices containing a gas discharge vent assembly for continuously discharging gas from the interior of the housing.

A variety of battery operated electrical devices are commercially available which are suitable for use outdoors in the rain as well as for general use in and about water. One such common device which falls into this class is a portable waterproof battery operated electric lamp such as a lantern or flashlight. The housing for the lamp is of necessity watertight so that the battery cells and the interior electrical system stay dry. In recent practice and as used herein the casing or housing for the lamp is considered to be "waterproof" if the interior of the lamp remains dry after the lamp has been submerged in water to a depth of at least three feet for a period of at least one hour. It is common practice to employ a gasket under compression to seal the housing of the electrical lamp to satisfy the waterproof requirement.

A dry galvanic cell develops gas during the normal course of storage and discharge reactions within the cell. The volume of gas generated by a dry cell with respect to time is dependent upon the selected electrochemical system for the cell, the chemistry of the source materials, and the conditions of storage and use of the cell. The type of sealing arrangement used for the cell container will determine the rate and extent to which generated gas will escape the cell container and outer finish into the surrounding housing. In primary dry cells based on manganese dioxide and zinc electrodes relatively moderate to heavy gassing of $H_2$ and $CO_2$ is an inherent characteristic. Moreover, commercially available Leclanche and zinc chloride primary dry cells are usually vented. Accordingly, evolved hydrogen and $CO_2$ readily escape from such cells. Although gassing to varying degrees is inherent in many other commercially available cell systems, they are sealed so as to render them relatively gas tight under normal operating conditions. Therefore the present invention is, in general, most useful in devices containing a vented primary dry cell based on a manganese dioxide and zinc electrode system.

Devices of the subject invention are designed to contain and operate on a given number of unit cells of a specific size or alternatively a multicell battery containing a given number of cells of a specific size. In the following table the approximate range of active zinc anode areas for cylindrical commercial dry cells of the Leclanche or zinc chloride types are listed for the size cells most commonly employed as unit cells or in batteries.

| CELL SIZE | ACTIVE ANODE AREA-RANGE IN INCHES$^2$ PER CELL |
| --- | --- |
| AA | 2.1–2.4 |
| C | 3.4–3.9 |
| D | 6.2–6.5 |
| F | 9.9–10.1 |

The total active anode area capable of generating gas within the device at any given time is determined by multiplying the number of unit cells employed times the area per cell as given above. This total area figure may then be employed to calculate the venting capacity required for diffusion of hydrogen gas. Area numbers of this kind are readily available from battery manufacturers for other size cells or odd shaped or flat type cells or batteries.

Although dry cell gassing rates are known to vary widely, it is possible to give some numbers to illustrate the magnitude of the problem. Fresh lantern batteries employing four size "F" cells per battery when placed on shelf storage at controlled temperatures were observed to liberate 34 cc (at S.T.P.) of hydrogen at 20° C. and 285 cc (at S.T.P.) of hydrogen at 45° C. per month. These were Leclanche type cells. Zinc chloride cells will liberate more gas because the pH of the electrolyte is lower, i.e., more acidic. Hydrogen is thought to be evolved as the result of corrosive attack on the zinc anode, and the amount of gas is proportional to the wetted or active zinc anode area. It is therefore possible to correlate the gassing rate and the necessary venting rate with the active anode area of the cell or battery. The active anode area of four size "F" cells is about 40 square inches. Converting the above monthly rates to a daily (24 hour basis) gives 0.0283 cc/24 hours/square inch of zinc area at 20° C. and 0.2375 cc/24 hours/square inch of zinc area at 45° C. Thus knowing the number and size of cells to be used in a given device, and the expected maximum temperature to which it may be exposed over extended periods, it is possible to estimate the approximate hydrogen evolution rate to be anticipated.

The evolution of hydrogen and carbon dioxide from the above noted vented primary dry cells is not ordinarily troublesome since these gases escape relatively quickly through unsealed structures. However, in gas tight waterproof structures the gases which evolve from the dry battery cells are contained within the housing of the device and in time may accumulate to cause a potentially undesirable condition. It was originally believed that any generation of gas would be accompanied by an increase in gas pressure and that a conventional pressure actuated resealable vent mechanism could be used for releasing this gas without affecting the waterproof characteristic of the device. However with plastic housings of polyolefin little, if any, pressure differential between the interior and exterior of the device was shown to exist. Analysis of the gas showed a loss of oxygen as well as an increase in hydrogen. It is now postulated that a constant gas pressure is established in the air space within the sealed housing, with the evolved hydrogen, as it accumulates, occupying the space vacated by oxygen. The oxygen is slowly consumed through reaction with the zinc metal of the cell. Stated otherwise, the % by volume of hydrogen within the air space initially increases until the hydrogen gas reaches a permeation rate through the plastic walls of the housing equal to its generation rate. This would account for a substantial accumulation of hydrogen without much or any increase in internal gas pressure. Although hydrogen levels as high as 26% have been observed in waterproof lanterns stored over one year, it is estimated that as much as 40 percent by volume of the free air space of a conventional hermetically sealed waterproof lantern could be represented by hydrogen gas after extended storage.

It is well known that hydrogen gas will burn in air. The lower combustible limit for hydrogen gas mixed with air is generally taken to be about 4% by volume. From the standpoint of the subject invention it is pertinent to inquire as to what percentage of hydrogen might constitute a hazard when confined in the free air space of a battery operated device. In general it was found that if the free air space in the device is relatively small and the walls of the housing are of flexible plastic a deliberately induced explosion therein of up to 30% by volume of hydrogen in air would be audible but would not disassemble or damage the device. In other devices with much larger free air space no damage occurred up to about 18% hydrogen by volume. The exact safe percentage for each device can be determined experimentally, but an upper level of 10% hydrogen in the free air space appears to provide an adequate margin of safety for flashlights, lanterns, and similar devices. No explosions were successfully induced by heavy sparking between internal electrodes at levels below 15% hydrogen in the ambient atmosphere inside the housing.

A vented housing construction has been developed in accordance with the present invention which permits internally generated hydrogen gas to escape by diffusion continuously at a rate sufficient to prevent substantial internal accumulation without affecting the waterproof characteristic of the housing.

Additional advantages of the present invention will become apparent from the following detailed description of the invention when read in conjunction with the accompanying drawings in which:

FIG. 1 is an expanded perspective view of a floating type hand lantern embodying the present invention;

FIGS. 2a–2c shows in section three variations of the gas discharge vent assembly of the present invention;

FIG. 3a is a view of a commercial hand held waterproof flashlight embodying the present invention;

FIG. 3b is a sectional detail of a portion of FIG. 3.

FIG. 4 is a perspective view illustrating yet another type of floating hand held flashlight device with the gas discharge vent assembly system of the present invention shown in various alternative locations about the housing; and FIG. 4a is an expanded sectional view of the gas discharge vent assembly of FIG. 4.

Referring now to FIG. 1 in which is shown a typical hand held lantern 10 having a hollow housing 12, a lamp bulb 14, reflector assembly 16, lens and ring 18, an "O" seal ring 19 and a lens hood 20. The housing 12 is preferably molded into a single body from a suitable plastic material such as polyethylene, polypropylene, ABS copolymer, or polystyrene. The lamp bulb 14 is inserted into a contact assembly 22 which includes an electrical socket 24 and a frame 26 electrically insulated from socket 24. A pair of electrical wires 28 and 30 extend from the socket 24 and frame 26 respectively. The wires 28 and 30 are electrically coupled to a conventional push button switch 32 which is mounted in any suitable wall section of the housing 12 preferably at a location readily accessible to the user. The movable button portion (not shown) of push button switch 32 extends from the housing 12 and is enclosed in a waterproof rubber jacket 34, which assures a watertight connection to the housing 12.

The lantern 10 is assembled by inserting a battery unit B of predetermined voltage within the hollow confines of the housing 12. The battery unit B may represent a single dry cell or may contain a multiple number of dry galvanic cells arranged as a single unit having the desired output voltage. There are a variety of battery units available commercially in which a plurality of individual dry galvanic cells are preassembled in one casing as a single battery unit B for use in a portable type lantern. Although the individual dry galvanic cells forming the battery unit B may be based on any conventional electrochemical system the housing structure of the present invention is particularly adapted for use in combination with a battery unit B containing vented primary dry galvanic cells based on a manganese dioxide and zinc electrode system such as the Leclanche or zinc chloride cell systems.

The battery unit B is inserted into the housing 12 with its positive and negative terminals 38, 39 respectively facing the open end 35 of the housing 12. The positive terminal 38 lies substantially in the center of the battery unit B whereas the negative terminal 39 lies closer to the outer periphery. The contact assembly 22 is placed up against the battery unit B with the positive terminal 38 contacting the bottom end of socket 24 and with the negative terminal 39 abutting the frame 26. The small end 37 of the reflector assembly 16 is then detachably connected to the contact assembly 22 with its reflector surface surrounding the lamp bulb 14. The "O" ring 19 is positioned within the lens ring 18 to form a lens assembly which is in turn detachably fastened to the large perimeter of the reflector assembly 16. The open end 35 of the housing 12 is then sealed closed by threadably fastening the lens ring 18 to the rim 40 of the housing 12 thereby forming a watertight enclosure for the battery unit B and the internal electrical components.

A lens hood 20 is thereafter releasably connected to the housing 12 through a pair of spring clips 36, 36 which extend from the lens cover 20 and engage a pair of indentations 43, 45 located on opposite sides of the housing 12. The lens hood 20 is protective and decorative only and is not intended to seal off the front face 50 of the housing 12 from the ambient atmosphere.

A gas discharge vent assembly 42 as is more clearly shown in FIGS. 2a–2c is incorporated into the housing 12 to facilitate escape of evolved gas generated by the battery unit B without affecting the waterproof characteristic of the housing. The gas discharge vent assembly 42 includes in combination an aperture 44 of predetermined size and a porous diffusion member 46 of predetermined composition and porosity. The aperture 44 represents an opening in the wall 48 of the housing 12. The size of the aperture 44 may determine the effective area of exposure to the atmosphere by diffusion member 46. The area of effective exposure and the number and size of pore of diffusion member 46 will largely control the rate of gas diffusion from the housing 12. The diffusion rate should be at least substantially equal to or greater than the rate of evolution for the unwanted hydrogen gas so as not to permit internal total pressure to rise much above atmospheric pressure and to prevent accumulation of more than about 10 percent of hydrogen by volume and preferably no more than about 5 percent by volume.

Although for purposes of the present invention a device is characterized as "waterproof" if it passes the 3 foot water immersion test for one hour without leakage as mentioned previously, some devices may need to withstand greater depths of immersion. Fortunately, suitable venting membranes are commercially available in a series of different pore sizes corresponding to various depths. This relationship is illustrated in the following table for a 0.002 inch thick microporous membrane of polytetrafluoroethylene.

| NOMINAL SIZE OF PORE (INCHES) | DEPTH OF WATER IMMERSION (IN FEET) REQUIRED TO EFFECT WATER PENETRATION |
| --- | --- |
| 0.00004 | 14 |
| 0.00002 | 40 |
| 0.000008 | 80 |
| 0.0000008 | 600 |

The hydrogen diffusion rate or gas permeability does of course lessen with decreasing pore size; however, even the finest pore material listed above has been found applicable in the practice of this invention.

The water immersion depth or water initiation pressure (in feet of water) is a function not only of the pore size but also of the wettability or hydrophobic nature of the material from which the membrane is formed. This property of hydrophobicity is usually related to the water contact angle which may be measured by one or more standard techniques. The most non-wettable or hydrophobic plastic materials useful in making microporous membranes include polyfluorocarbons, polyethylene, and polypropylene. Other materials somewhat more wettable may require a finer pore size for any given water initiation pressure. For purposes of this invention the word "hydrophobic" is defined as being sufficiently water repellent such that a microporous membrane of a "hydrophobic material" can be fabricated to meet at least the minimum depth of 3 feet on the water immersion test. Plastic or polymeric materials which may be hydrophobic as defined are believed to include at least the following: polyfluorocarbons, polyolefins, ethylene copolymers, rubber hydrochloride, polyester, polyamide, polyurethane, polycarbonate, silicone polymer, cellulose esters, ethyl cellulose, vinyl polymers, vinyl copolymers, vinylidene polymers, epoxy polymers, and polystyrene. Suitable membranes may also be prepared from other types of microporous materials such as glass, ceramic, carbon, metals, and the like which have been treated with a silicone material or other waterproofing agent, either gaseous or liquid, to make them permanently hydrophobic.

Such materials as the above are suitable in the practice of this invention only if they are microporous. The term "microporous" is herein defined as being free from pinholes, of an open pore structure, with a maximum pore size of about 0.00007 inch (1.78 microns), and having substantially all of the pores larger than about 0.0000004 inch (0.01 micron). A preferred range of pore size is from about 0.02 micron to about 1.0 micron. Such uniform controlled microporosity is developed in plastic materials by such known methods as removal of fugitives or mechanical stretch cracking. In general the microporous membranes herein employed are at least one hundred times more permeable to gases than are the usual wrapping and packaging films made from the same type of plastic materials. The material known under the Trade Mark "Gore-Tex" is preferred; however, other Trade Marked materials such as Raybestos-Manhattan Porous TFE, Zitex, Porex PTFE, and Celgard may also be suitable in the practice of this invention.

The venting capacity or hydrogen permeability of the diffusion member 46 of this invention will be adequate to maintain the concentration of hydrogen gas within the housing at or below 10% by volume providing sufficient venting area is exposed to permit diffusion of hydrogen gas at a rate under standard conditions of at least about 10 cc/24 hr./atmosphere of differential pressure at 20° C. for each square inch of active zinc area employed in the battery or cells of the subject device, said volume of gas in cc. being referred to standard conditions of temperature and pressure of 20° C. and 1.0 atmosphere pressure. The actual rate at which hydrogen gas is vented from the housing at any given instant depends upon the ambient temperature and the partial pressure of hydrogen gas which may be about 0.1 atmosphere, more or less, and said actual venting rate will be about 10%, more or less, of the venting capacity as specified at standard conditions. By way of example, a microporous membrane of polytetrafluoroethylene with a uniform pore size of about $0.8 \times 10^{-6}$ inch, when mounted in the housing wall of a watertight 5 cell (Size "D") flashlight over a venting aperture 0.06 inch in diameter, has been shown to maintain the hydrogen concentration within the housing at or below 10% by volume under various storage and test conditions. The effective venting area of the diffusion member was 0.0123 inch$^2$ as determined by the area bounded by the fusion circle bonding the membrane to the housing wall.

In summary, the following properties are required of a membrane material to be suitable for use in the diffusion member of this invention:
1—Microporosity
2—Hydrophobicity
3—Chemical stability in contact with water, hydrogen and air.
4—Mechanicalstability
5—Hydrogen permeability
6—Freedom from pinholes
7—Attachability The property of "attachability" refers generally to the ease with which a secure watertight bond can be established between the membrane material and the housing. Either adhesive bonding or fusion bonding may be employed to establish the gastight and watertight annular seal junction surrounding the venting aperture and adhering the membrane to the wall of the housing. Solvent type or hot melt adhesives may be used. Fusion bonding may be readily accomplished between compatible materials by high frequency ultrasonic welding, for example. Handling and attachment of the membrane may be facilitated by providing a macroporous backing layer securely adhered to the microporous membrane material. Such a backing layer would usually be thicker than the membrane material and of larger pore size and possibly of a different composition. In this case the watertight annular seal junction would be established in the backing layer between the membrane and the housing wall. The main function of the backing layer is to facilitate attachment of the membrane, but if sufficiently thick and porous it will also serve to spread the diffusing gas more widely across the adjacent face of the membrane thereby making available for gas diffusion the full area within the annual seal junction and thereby reduce the influence of the smaller aperture area on the overall diffusion rate.

Diffusion member 46 may thus be of a single layer or a multi-layer or laminated construction. A preferred material is exemplified by a microporous film of polytetrafluoroethylene about 0.002 inch thick laminated on a 0.008 inch thick macroporous backing matte of polypropylene fibers. A suitable such material is available in a range of micropore sizes as "Gore-Tex" from W. L. Gore & Associates, Inc. Microporous membranes are relatively expensive as compared with non-porous wrapping films or with macroporous battery separator materials. From a cost standpoint a thickness of about 0.003 inch for the microporous membrane provides a good balance between economy of material usage and freedom from pinholes.

The venting member should be positioned in the housing wall in a location providing some protection from contamination by dirt, from mechanical injury, and from curious, prying fingers. It is preferable for this reason to mount the member on the internal face of the housing, however it will function equally well on the internal or external face. It is obvious that two or more venting members could be employed in one housing if desired. Also, two or more concentric annular seal junctions could be employed about a single aperture for additional assurance of a waterproof seal if desired.

With further reference to FIGS. 2a–2c the vent assembly can be installed by forming an aperture 44 of predetermined size in the wall 48 of the housing 12. The diffusion member 46 is then placed over the aperture 44 on either side of the wall 48 corresponding to the inner and outer face of housing 12. The aperture 44 can be formed by molding the housing so as to leave a recessed opening in the preferred location or by simply drilling an opening into the housing. The diffusion member 46 can be fastened around its periphery to the housing 12 in any conventional manner such as by means of an adhesive or by high frequency ultrasonic welding. Another alternative as exemplified in FIG. 2b is to injection mold the housing 12 into a mold which is modified with the diffusion member as an insert so that the body 48 is formed integrally with the diffusion member disposed within a space defining the aperture 44.

In another embodiment of the invention as shown in FIGS. 3a and 3b a diffusion member is formed integrally with a gasket 54 to form the vent assembly of the invention. The gasket 54 seals the threadably engaging molded sections 56 and 58 of a conventional commercially available waterproof flashlight 60. The diffusion member 46 may be formed as a ring which is adhesively connected to the sealing gasket 54 so that one edge lies in fluid communication with the external atmosphere and another edge is fluid communication with the flashlight interior through the threaded couplings between sections 56 and 58 respectively. Alternatively the sealing gasket may be formed from the diffusion member 46 by laminating a thin microporous membrane of, for example, polytetrafluoroethylene on a porous rubber-backing material of desired thickness. The pore size would be determined by the exposed surface area of the microporous membrane and the extent of waterproofing needed, i.e. the depth of water immersion to be withstood.

Another conventional waterproof hand held electric lamp having a housing suitable for incorporating the gas discharge vent assembly of the present invention is shown in FIG. 4a. The electric lamp 70, as shown, has a molded housing of polypropylene with a relatively large diameter lamp assembly 72 which is threadably coupled to a push button switching module 74 which is in turn threadably coupled to an elongated tube assembly 76. Sealing gaskets (not shown) are intercoupled between the threaded connections to provide a waterproof housing structure. The tube assembly 76 is designed to carry 5 "D" size Leclanche type batteries in a series arrangement. The internal construction of the lamp is substantial similar to the lamp of FIG. 3a which is described in substantial detail in U.S. Pat. No. 3,798,440 the disclosure being incorporated herein by reference.

The vent assembly 78 is equivalent to the vent assembly 42 of FIGS. 1 and 2a–2c. As more clearly shown in FIG. 4b the vent assembly 78 includes the aperture 80, and a porous diffusion member 82 laminated on a backing material 84 of polypropylene fibers. The laminated members 82 and 84 are ultrasonically welded around the periphery of the opening 80 internal of the lamp housing. The preferred location for the vent assembly 78 is on the inclined surface 86 of the lamp assembly 72. Alternate locations for the vent assembly 78 are shown in FIG. 4 in dotted lines.

I claim:

1. In an electrically operated device comprising a waterproof housing enclosing at least one dry galvanic battery cell as the source of electrical energy for said device, said battery cell normally evolving hydrogen gas, the improvement comprising gas discharge means for continuously discharging said evolved hydrogen gas from the interior of said device including at least one aperture of predetermined size disposed in said housing in fluid communication with said interior and the atmosphere exterior to said device and a hydrophobic membrane, said membrane covering each aperture and secured watertightly thereabout and being of a predetermined composition and microporosity such that the concentration of hydrogen gas within the air space in said housing interior is maintained below about 10% by volume.

2. In an electrically operated device as defined in claim 1 wherein said at least one dry galvanic cell employs a zinc anode having a predetermined active anode area.

3. In an electrically operated device as defined in claim 2 wherein said gas discharge means has a hydrogen permeability under standard conditions of at least about 10 cc/24 hr./atm. differential pressure at 20° C. for each square inch of said predetermined zinc active area.

4. In an electrically operated device as defined in claim 3 wherein said membrane is composed substantially of a polymeric plastic material selected from the class consisting of polyfluorocarbons, polyolefins, ethylene copolymers, rubber hydrochloride, polyester, polyamide, polyurethane, polycarbonate, silicone polymer, cellulose esters, ethyl cellulose, vinyl polymers, vinyl copolymers, and vinylidene polymers.

5. In an electrically operated device as defined in claim 3 wherein said membrane is composed substantially of a polymeric plastic material selected from the class consisting of polyethylene, polypropylene, and polytetrafluoroethylene.

6. In an electrically operated device as defined in claim 3 wherein said gas discharge means comprises a thin microporous hydrogen-permeable hydrophobic membrane composed of polytetrafluoroethylene and laminated to a layer of porous polypropylene, said layer of porous polypropylene facilitating the watertight attachment of said membrane about said aperture.

7. In an electrically operated device as defined in claim 3 wherein said gas discharge means comprises a thin microporous hydrogen-permeable hydrophobic membrane composed of polytetrafluoroethylene with said membrane having a multiplicity of open pores no larger than about 1.78 microns (micrometers) in size.

8. In an electrically operated device as defined in claim 7 wherein said membrane has a thickness of less than about 0.003 inch (0.0076 cm).

9. In an electrically operated device as defined in claim 4 wherein said membrane is adhesively bonded to said housing about said aperture.

10. In an electrically operated device as defined in claim 4 wherein said membrane is fusion bonded to said housing about said aperture.

11. In an electrically operated device as defined in claim 4 wherein said membrane is disposed on the inner face of said housing.

12. In an electrically operated device as defined in claim 4 wherein said membrane is disposed on the outer face of said housing.

13. In an electrically operated device as defined in claim 4 wherein the said membrane is insert molded into said housing within said aperture.

14. In an electrically operated device as defined in claim 6 wherein said polytetrafluoroethylene membrane has a multiplicity of open pores no larger than about 1.0 micrometer in size and a thickness of less than about 0.003 inch (0.0076 cm.) and wherein said membrane is watertightly secured about said aperture by means of a fused annular portion of said layer of porous polypropylene.

15. In an electrically operated device as defined in claim 14 further comprising a reflector and lamp assembly including a lamp bulb adapted to generate light and circuit means for electrically connecting said lamp assembly to said at least one battery cell.

16. In a waterproof electric lamp comprising a housing enclosing a lamp bulb, socket, reflector, and lens and at least one dry galvanic cell normally evolving hydrogen gas, said housing being formed in at least two sections mechanically coupled together through a sealing gasket, the improvement comprising a thin microporous hydrogen-permeable hydrophobic membrane surrounding a portion of said gasket for continuously discharging said evolved hydrogen gas from said device, said membrane having a multiplicity of open pores no larger than about 1.78 microns in size and being composed of a hydrophobic material selected from the class consisting of polyethylene, polypropylene, and polytetrafluoroethylene and exposing sufficient membrane area in fluid communication with the atmosphere about the exterior of said electric lamp for diffusion of hydrogen gas at a rate under standard conditions of at least about 10 cc/24 hr./atm. differential pressure at 20° C. for each square inch of active zinc area in said at least one dry galvanic cell, whereby the concentration of hydrogen gas within the air space in said housing is maintained below about 10% by volume.

* * * * *